United States Patent [19]

Scaglione et al.

[11] Patent Number: 5,000,973
[45] Date of Patent: Mar. 19, 1991

[54] NUTRITIONALLY-BALANCED CANINE BISCUITS CONTAINING AN INORGANIC PYROPHOSPHATE

[75] Inventors: Felice Scaglione, Hasbrouck Heights; Lorna C. Staples, Teaneck, both of N.J.

[73] Assignee: Nabisco Brands, Inc., East Hanover, N.J.

[21] Appl. No.: 358,174

[22] Filed: May 30, 1989

[51] Int. Cl.$^5$ .................. A23L 1/30; A61K 7/20; A61K 7/16
[52] U.S. Cl. .................. 426/549; 426/89; 426/94; 426/302; 426/289; 426/551; 426/560; 426/805; 424/442; 424/49; 424/53; 424/57
[58] Field of Search .................. 426/89, 94, 302, 289, 426/549, 551, 560, 805; 424/442, 49, 53, 57

[56] References Cited

U.S. PATENT DOCUMENTS

| | | | |
|---|---|---|---|
| 2,870,017 | 1/1959 | Barch | 426/563 |
| 2,941,926 | 6/1960 | Salzman et al. | 424/57 |
| 3,112,247 | 11/1963 | Schweizer | 424/52 |
| 3,137,632 | 6/1964 | Schiraldi | 424/49 |
| 3,194,738 | 7/1965 | Harrison et al. | 424/48 |
| 3,375,168 | 3/1968 | Curtin et al. | 424/57 |
| 3,442,604 | 5/1969 | Smith et al. | 424/57 |
| 3,488,419 | 1/1970 | McCune et al. | 424/49 |
| 3,535,420 | 10/1970 | McCune et al. | 424/49 |
| 3,567,459 | 3/1971 | Wruk, III et al. | 99/2 |
| 3,639,569 | 2/1972 | Medcalf, Jr. | 424/48 |
| 3,686,393 | 8/1972 | Woodruff et al. | 424/50 |
| 3,701,830 | 10/1972 | Welwrich et al. | 424/94 |
| 3,871,334 | 3/1975 | Axelrod | 119/29.5 |
| 3,882,257 | 5/1975 | Cagle | 426/274 |
| 3,899,607 | 8/1975 | Miller et al. | 426/285 |
| 3,927,201 | 12/1975 | Baines et al. | 424/54 |
| 3,934,002 | 1/1976 | Haefele | 424/54 |
| 3,942,537 | 3/1976 | Evers et al. | 131/278 |
| 3,956,479 | 5/1976 | Bauman | 424/54 |
| 3,957,964 | 5/1976 | Grimm, III | 424/10 |
| 3,959,458 | 5/1976 | Agricola et al. | 424/52 |
| 4,003,971 | 1/1977 | Mannara | 264/9 |
| 4,022,879 | 5/1977 | Dietrich | 424/49 |
| 4,044,158 | 8/1977 | Burkwall, Jr. | 426/271 |
| 4,145,447 | 3/1979 | Fisher et al. | 426/72 |
| 4,153,732 | 5/1979 | Muhler et al. | 426/72 |
| 4,215,149 | 7/1980 | Majlinger | 426/292 |
| 4,244,931 | 1/1981 | Jarvis et al. | 423/266 |
| 4,254,101 | 3/1981 | Demny, Jr. | 424/52 |
| 4,259,358 | 3/1981 | Duthie | 426/46 |
| 4,260,635 | 4/1981 | Fisher | 426/3 |
| 4,314,990 | 2/1982 | Denny, Jr. et al. | 424/52 |
| 4,323,551 | 4/1982 | Parran, Jr. | 424/54 |
| 4,364,925 | 12/1982 | Fisher | 424/50 |
| 4,419,372 | 12/1983 | Greene et al. | 426/635 |
| 4,421,527 | 12/1983 | Wason | 51/308 |
| 4,472,373 | 9/1984 | Ryan | 424/54 |
| 4,513,014 | 4/1985 | Edwards | 426/132 |
| 4,515,770 | 5/1985 | Besic | 424/49 |
| 4,515,772 | 5/1985 | Parran, Jr. et al. | 424/57 |
| 4,532,124 | 7/1985 | Pearce | 424/52 |
| 4,535,725 | 8/1985 | Fisher | 119/29 |
| 4,540,584 | 9/1985 | Someya | 424/156 |
| 4,557,219 | 12/1985 | Edwards | 119/29.5 |
| 4,590,066 | 5/1986 | Parran et al. | 424/52 |
| 4,627,977 | 12/1986 | Gaffar et al. | 424/52 |
| 4,634,448 | 1/1987 | Ajioka et al. | 8/436 |
| 4,674,444 | 6/1987 | Axelrod | 119/29.5 |
| 4,678,662 | 7/1987 | Chan | 424/57 |
| 4,684,518 | 8/1987 | Parran, Jr. et al. | 424/52 |
| 4,702,929 | 10/1987 | Lehn et al. | 426/635 |
| 4,735,808 | 4/1988 | Scaglione et al. | 426/62 |
| 4,771,733 | 9/1988 | Axelrod | 119/29.5 |
| 4,771,773 | 9/1988 | Axelrod | 128/341 |
| 4,795,655 | 1/1989 | Spiel et al. | 426/635 |
| 4,802,444 | 2/1989 | Markham et al. | 119/29 |
| 4,806,340 | 2/1989 | Gaffar et al. | 424/52 |
| 4,822,626 | 4/1899 | Spanier et al. | 426/94 |

FOREIGN PATENT DOCUMENTS

| | | |
|---|---|---|
| 168071 | 12/1953 | Australia . |
| 1233121 | 2/1988 | Canada . |
| 079611 | 5/1983 | European Pat. Off. . |
| 0097476 | 1/1984 | European Pat. Off. . |
| 236920 | 3/1987 | European Pat. Off. . |
| 0236290 | 9/1987 | European Pat. Off. . |
| 0236827 | 9/1987 | European Pat. Off. . |
| 2188548 | 10/1987 | European Pat. Off. . |
| 0249398 | 12/1987 | European Pat. Off. . |
| 0251591 | 1/1988 | European Pat. Off. . |
| 0254452 | 1/1988 | European Pat. Off. . |
| 0288909 | 11/1988 | European Pat. Off. . |
| 0291747 | 11/1988 | European Pat. Off. . |
| 0295116 | 12/1988 | European Pat. Off. . |
| 0297211 | 1/1989 | European Pat. Off. . |
| 0297212 | 1/1989 | European Pat. Off. . |

(List continued on next page.)

OTHER PUBLICATIONS

Chemical Abstracts 89: 74468t (1978).
Chemical Abstracts 83: 57001u (1975).
Chemical Abstracts 84:14958q (1976).
Phospheric acid and phosphates, Encyclopedia of Chemical Technology, Kirk–Othmer 2d revised Ed. (1968), vol. 15, pp. 232–272.
The National Research Council of the National Academy of Sciences, "Nutritional Requirements of Domestic Animals", (Rev. 1974), Nutrient Requirements of Dogs, pp. 9 to 11, 13, 14 and 35.

Primary Examiner—Ronald W. Griffin

[57] ABSTRACT

Process for preparing dog biscuits which are nutritionally balanced and which contain at least one inorganic pyrophosphate salt. The ingredients and the at least one inorganic pyrophosphate salt are selected and adjusted in amounts to provide a nutritional balance in the dog biscuit dough, from which the dog biscuits are produced. The nutritionally-balanced dog biscuits containing at least one inorganic pyrophosphate salt are chewed and/or eaten by dogs, with the result that tartar accumulations on their teeth are reduced or prevented.

5 Claims, No Drawings

FOREIGN PATENT DOCUMENTS

| | | |
|---|---|---|
| 0297213 | 1/1989 | European Pat. Off. |
| 305283 | 3/1989 | European Pat. Off. |
| 0309414 | 3/1989 | European Pat. Off. |
| 0311412 | 4/1989 | European Pat. Off. |
| 0316079 | 5/1989 | European Pat. Off. |
| 0319516 | 6/1989 | European Pat. Off. |
| 330075 | 8/1989 | European Pat. Off. |
| 2643991 | 3/1978 | Fed. Rep. of Germany |
| 2749581 | 5/1978 | Fed. Rep. of Germany |
| 3041237 | 6/1982 | Fed. Rep. of Germany |
| 3426203 | 7/1984 | Fed. Rep. of Germany |
| 3417235 | 6/1985 | Fed. Rep. of Germany |
| 3607480 | 9/1987 | Fed. Rep. of Germany |
| 777556 | 6/1957 | United Kingdom |
| 1179343 | 1/1970 | United Kingdom |
| 1386627 | 3/1973 | United Kingdom |
| 2092000 | 8/1982 | United Kingdom |
| 2109086 | 6/1983 | United Kingdom |
| 2180157 | 3/1987 | United Kingdom |
| 2182244 | 5/1987 | United Kingdom |
| 2191500 | 12/1987 | United Kingdom |
| 2194426 | 3/1988 | United Kingdom |
| 2200551 | 8/1988 | United Kingdom |
| 2201593 | 9/1988 | United Kingdom |
| 2204487 | 11/1988 | United Kingdom |
| 2206027 | 12/1988 | United Kingdom |
| 8603674 | 7/1986 | World Int. Prop. O. |

NUTRITIONALLY-BALANCED CANINE BISCUITS CONTAINING AN INORGANIC PYROPHOSPHATE

BACKGROUND OF THE ART

1. Field Of The Invention

The invention relates to nutritionally-balanced canine biscuits containing an anti-tartar agent. The invention also relates to a process of preparing such canine biscuits. The invention further relates to a process of preventing tartar formation on dogs' teeth by the dog chewing on and eating such canine biscuits.

2. Background Art

Dental calculus, or tartar as it is sometimes called, is a deposit which forms on the surfaces of the teeth at the gingival margin. Supraginival calculus appears principally in the areas near the orifices of the salivary ducts; e.g., on the lingual surfaces of the lower anterior teeth and on the buccal surfaces of the upper first and second molars, and on the distal surfaces of the posterior molars. Matural calculus consists of an inorganic portion which is largely calcium phosphate arranged in a hydroxylapatite crystal lattice structure similar to one, enamel and dentine. An organic portion is also present and consists of desquamated epithelial cells, leukocytes, salivary sediment, food debris and various types of microorganisms. As the mature calculus develops, it becomes visibly white or yellowish in color unless stained or discolored by some extraneous agency. In addition to being unsightly and undesirable from an aesthetic standpoint, the mature calculus deposits are constant sources of irritation of the gingiva and thereby are a contributing factor to gingivitis and other diseases of the supporting structures of the teeth, the irritation decreasing the resistance of tissues to endogeneous and exogenous organisms.

A wide variety of chemical and biological agents have been suggested in the art to retard calculus formation or to remove calculus after it is formed in humans. Mechanical removal of this material is done routinely in humans.

German Patent No. 3,426,203 discloses a chewing article for dogs consisting of 92 vol. parts of raw skin, 4 vol. parts of lime and 4 vol. parts of feed salts mixture containing (per 100 g) 700 mg of potassium, 1500 mg of carbonate, 1000 mg of calcium, 110 mg of phosphate, 40 mg of iron and 1 mg of iodine. The article is prepared from cow skin by stripping the skin, and subjecting the subcutaneous material to neutralization to pH 6, treating with a solution of iodine-containing feed salt and lime, shaping to form the article and drying.

U.S. Pat. No. 4,145,447 discloses a hard, unit-integral, unitized, self-contained, compact, chew-resistant nutritionally balanced animal food product 3 final having a density of at least about 0.5 oz./in.$^3$, a final water content of at least about 5.5 percent by weight, and a breaking force of at least about 60 psi. The animal food contains, for example, dried meals, dried fish, dried dairy products, fish meal, fish flour, cereals, flours, carbohydrates, dried fruits, etc., with or without food additives or supplements such as vitamins, minerals, medicinals, etc., for example chemicals, enzymes, etc., capable of removing plaque or tartar from the animals's teeth, etc.

U.S Pat. No. 4,044,158 discloses the use of tetrasodium pyrophosphate as a chelating agent in semi-moist pet foods. The neutral chelating agent is used in a semi-moist pet food having a pH of from 6.3 to 7.2 and which comprises about 5 to about 50 percent by weight meat or meat by-products, about 15 to about 50 percent moisture, and about 1 percent to about 26 percent by weight vegetable protein. The vegetable protein, an amylaceous material, and the chelating agent, it is taught, forms a composition which replaces part of the caseinate binder customarily present in a semi-moist pet food. No mention is made of any anti-tartar effectiveness of the pet food.

U.S. Pat. No. 4,215,149 discloses a process for maintaining the palatability of a pet food by coating particulates having a moisture content of less than 15 percent with fat and then with a monoalkali metal or monoalkaline earth metal salt of phosphoric acid to make the food more palatable to cats. Exemplary salts are monosodium phosphate and monocalcium phosphate.

U.S. Pat. No. 3,639,569 discloses the use of a tris-(phosphonoalkyl)amine in a dentifrice composition with a dentifrice abrasive selected from the group consisting of beta-phase calcium pyrophosphate, particulate thermosetting polymerized resin, alumina, sodium metaphosphate, and mixture thereof, or in a mouthwash composition, or in a chewing gum composition or dental prophylaxis paste composition. The patent discloses that the use of inorganic pyrophosphates as anti-calculus agents in oral compositions has the problem of hydrolysis in aqueous products and loss of activity prior to the termination of the normal shelf-life of such products. The patent also teaches that calculus inhibition by chelation of calcium ion may seriously damage tooth structure by decalcification.

U.S. Pat. No. 3,957,964 discloses microcapsules containing essential oils of mint flavor in a dentifrice adapted to release a plural flavor-burst signaling the onset of and the completion of a toothbrushing operation. The dentifrice may be a toothpaste having dicalcium phosphate as a polishing agent.

U.S. Pat. No. 3,959,458 discloses the use of from about 0.2 to about 8 percent by weight of an orally acceptable monofluorophosphate with an anticalculus agent which is a condensation product of ammonia and phosphorus pentoxide or with a polyphosphonate in an oral composition. The oral composition may further contain a calcium pyrophosphate abrasive. The patent teaches that sodium or 4 Calcium monofluorophosphate, when used in combination with the anticalculus agents, exhibit no detectable damage to silicate fillings in the mouth whereas other anticaries agents, such as sodium fluoride, do exhibit damage. It is also taught that below about pH 5.0 some of the anticalculus agents can damage dental enamel.

U.S. Pat. No. 4,314,990 discloses the use of a phosphate buffering agent, which provides phosphate ions to maintain the pH of a slurry in the range of about 6.8 to 8.0, in a toothpaste composition which comprises 6 to 45 percent of a silica dental abrasive, from about 0.01 to 3 percent of a fluoride ion source, from about 10 to 45 percent of water, and about 30 to 70 percent of a humectant.

U.S. Pat. No. 4,323,551 discloses the use of a tetra-alkali metal pyrophosphate salt to provide from about 0 5 to 5 percent of the $P_2O_7$ species in a mouthwash composition comprising 0.02 to 0.2 percent of a quaternary ammonium compound, and a carrier liquid wherein the pH is adjusted to about 7.0 to 9.5 with a mineral or organic acid.

U.S. Pat. No. 4,421,527 discloses the use of a precipitated amorphous silicon dioxide prepared by acidulation in an abrasive composition in a toothpaste that contains fluoride. Phosphoric acid is disclosed as an acidulant. Soluble phosphates, such as the pyrophosphates, are taught as improving fluoride pellicle penetration.

U.S. Pat. No. 4,515,770 discloses a process wherein a soluble source of phosphate ions or a soluble source of calcium ions is uniformally distributed through sucrose in crystalline form as a result of dissolution of the sucrose and soluble source of calcium or phosphate ions in water followed by evaporation of the water solvent. It is taught that it is of substantial importance that the calcium or phosphate ion source be as rapidly soluble in saliva as the sugar so that the protective ions will migrate to salivary retention areas as rapidly as the sugar. A material, it is taught, which is cariogenic by virtue of directly or indirectly participating in the lowering of pH in salivary retention areas is rendered non-cariogenic by treatment to incorporate enough of either a calcium or phosphate ion source to keep the acidic medium from dissolving the tooth enamel. It is also disclosed that systematically administered phosphates are said to differ in cariostatic activity depending o the type of anion (cyclictrimeta-, hexameta-, ortho-, and pyrophosphate, increasing in effectiveness in that order). It is further taught that these developments have unfortunately resulted in only minor advances in prevention of carious degradation of teeth because none of the "remineralization" processes have been shown to be consistently effective.

U.S. Pat. No. 4,515,772 discloses the use of from about 10 to about 70 percent of a dental abrasive selected from the group consisting of insoluble metaphosphates, alumina, thermosetting polymerized resins, and silica from about 50 ppm to about 3,500 ppm of fluoride ions from a fluoride ion source, and an amount of a pyrophosphate salt selected from the group consisting of dialkali metal and mixtures of dialkali metal and tetraalkali metal pyrophosphate salts sufficient to provide at least 1.5 percent $P_2O_7$. The pyrophosphate ion is provided by a percent $P_2O_7$; mixture of disodium pyrophosphate and tetrasodium pyrophosphate. The fluoride ion source is disclosed as an essential component. The upper limits on the sodium pyrophosphate salts are determined by solubility considerations, while the tetrapotassium level is established for taste reasons. It is further taught that surprisingly mixtures of certain pyrophosphate salts can provide a safe and effective anti-calculus product while also not presenting difficult formulation problems.

U.S. Pat. No. 4,532,124 discloses the use of a plaque mineralizing aqueous solution comprising urea, a fluoride salt, a water-soluble calcium salt, and a water-soluble phosphate salt in the mineralization of dental plaque. It is disclosed that high plaque calcium and inorganic phosphate levels will lower the critical pH, the pH which plaque must reach before it becomes unsaturated with respect to biological apatite, and enamel dissolution commences. The urea is metabolized by bacteria to produce alkali in plaque. Aspartame and amino acids may be substituted for urea.

U.S. Pat. No. 4,540,584 discloses the use of coral sand as an effective component in a mineral supplement in an amount sufficient to provide calcium carbonate as a mineral supplemental for humans, such coral sand also containing PO4. The composition, it is taught, is useful for replenishing calcium and phosphorous, as well as other minerals. Acidic foods tend to result in decayed teeth and bone fractures because of calcium poverty.

U.S. Pat. No. 3,567,459 discloses conversion of a hot melt of sugar having a moisture content less than 5 percent to a dough-like bone-forming composition by incorporation of nutritional fillers, fatty flavoring materials, and fat-absorbing farinaceous materials. The composition is formed and cooled. The patent teaches mastication of bones provides teeth cleaning benefits stemming from abrasion and other contacts of bone fragments.

U.S Pat. No. 3,701,830 discloses the use of a neutral protease enzyme for removing plaque from and preventing the formation of calculus on the teeth of dogs wherein the neutral protease is obtained by fermentation with a strain of Bacillus suptilis or Bacillus sterothermophilus.

U.S. Pat. No. 3,882,257 discloses a process where 75 percent by weight of bones is admixed with 23.5 percent by weight of animal by-products, and the mixture is bound with salt in the preparation of a pet food having about 40 percent natural animal protein. The product enables a dog to exercise his jaws and gums to remove tartar from teeth.

U.S. Pat. No. 3,899,607 discloses a dough mixture which is: worked and shaped at a temperature of 170° to 220° F. to form a simulated bone having a structural matrix; or cooked, dried to a moisture content of between 5 and 12 percent by weight, ground and mixed with a dextrin adhesive to form a simulated bone having a structural matrix.

U.S. Pat. No. 4,364,925 discloses an enzyme for removing plaque and/or tartar from the teeth is included in a chew-resistant layer of an integral chew-resistant multi-layer animal food system having a structure supporting fibers. A cracker containing protease or amylase. U.S. Pat. Nos. 3,194,738 and 3,686,393 also relate to the use of enzymes for inhibiting plaque.

U.S. Pat. No. 3,488,419 discloses the use of a polyphosphonate or salt thereof in an oral composition or toothpaste. The patent teaches that inorganic polyphosphates, such as pyrophosphates, hydrolyze in aqueous products and do not remain in active form throughout the normal shelf-life of such products. The patent also teaches that calculus inhibition by chelation of calcium ion may seriously damage tooth structure by decalcification.

U.S. Pat. No. 3,535,420 discloses the use of a cyclic tetraphosphonic acid as an anti-calculus agent in an oral composition. The patent teaches that inorganic polyphosphates, such as pyrophosphates, hydrolyze in aqueous products and do not remain in active form throughout the normal shelf-life of such products. It is also taught that although certain of the art-disclosed chelators are purportedly safe for use on dental enamel, the chemical similarity of calculus to the tooth structure limits the usefulness of the chelation approach because the more effective chelators can seriously damage the tooth structure by decalcification. The cyclic tetraphosphonates are calcium sequestrants, but they retard calculus formation by a mechanism that is believed to involve the inhibition of hydroxylapatite crystal growth rather than calcium sequestering.

U.S. Pat. No. 3,686,393 discloses the use of a dextranase used to eliminate dental plaque formation.

U.S. Pat. No. 3,956,479 discloses the use of a quaternary ammonium compound having a carbamate, or a thiocarbamate, or a dithiocarbamate, or a carbamide group in an oral preparation. The compounds, it is taught, are effective in reducing caries and inhibiting formation of oral calculus.

U.S. Pat. No. 4,003,971 discloses the use of a dentifrice component in the production of dentifrice speckles Antimicrobial agents for incorporation into oral dentifrice formulations may be effective by reducing dental plaque or inhibiting the formation of dental calculus.

U.S. Pat. No. 4,254,101 discloses the use of from about 6 to 45 percent of a silica dental abrasive, from about 30 to 70 percent of a humectant, and from about 0.03 to 1.0 percent of a carboxyvinyl polymer in a toothpaste composition. The use of optional anticalculus agents, in amounts of from about 0.01 to 2.5 percent by weight of the toothpaste composition are taught.

U.S. Pat. No. 4,472,373 discloses the use of a pyridium salt as an anti-plaque agent in a flavored alcoholic carrier. Phosphates, such as calcium pyrophosphate, are disclosed as dentifrice abrasives.

U.S. Pat. No. 4,153,732 discloses the use of at least one soluble aluminum ion containing salt with adipic acid, ascorbic acid, or mixtures thereof as a cariostatic additive for comestibles. The patent teaches that calcium pyrophosphate and insoluble sodium metaphosphate abrasives coact with aluminum fluoride in dentifrice compositions.

U.S. Pat. No. 4,627,977 discloses an oral composition, such as, a toothpaste (including gel or cream), mouthwash, lozenge, chewing gum or tooth powder, containing a calculus-inhibiting amount of a linear molecularly dehydrated polyphosphate salt (e.g., a water-soluble alkali metal pyrophosphate) to inhibit enzymatic hydrolysis of said polyphosphate salt in saliva, a combination of a fluoride ion-providing source and a synthetic linear polymeric polycarboxylate. See also British Published Patent Application No. 2,180,157.

U.S. Pat. No. 4,678,662 discloses calcium carbonate particles coated with at least one pyrophosphate derivative, such as, disodium dihydrogen pyrophosphate and tetrasodium pyrophosphate.

European Published Patent Application No. 0236920 discloses a dentifrice comprising essentially insoluble calcium pyrophosphate as an abrasive and clinically effective amount of soluble pyrophosphate, such as, tetrasodium pyrophosphate, or tripolyphosphate as an anticalculus agent.

U.S. Pat. No. 4,684,518 discloses a process for reducing the incidence of calculus on dental enamel. The enamel surfaces in the mouth are contacted with a composition comprising a soluble pyrophosphate source capable of providing at least 1.5 percent of $P_2O_7$ and from about 50 to about 3500 ppm of fluorine.

U.S. Pat. No. 4,722,461 discloses an oral composition in the form of a mouthwash or liquid dentifrice comprising: an amount of a fluoride ion source sufficient to supply from about 50 ppm to about 3500 ppm of fluoride ions; an amount of a pyrophosphate salt selected from the group consisting of dialkali metal and mixtures of dialkali metal and tetra-alkali metal pyrophosphate salts sufficient to provide at least 1.5 percent of $P_2O_7$; and water. The pH of the composition is from about 6.0 to about 10.0. Calcium pyrophosphate is termed to be an abrasive. See European Published Patent Application No. 0097476.

British Published Patent Application No. 2,201,593 discloses an oral composition in the form of a toothpaste effective in reducing calculus comprising: a safe and effective amount of a soluble pyrophosphate salt or mixture of the salts; from about 5 to about 60 percent of a suitable toothpaste abrasive; an amount of a fluoride ion source sufficient to provide from about 50 ppm to about 3500 ppm fluoride; from about 5 to about 60 percent of humectant selected from the group consisting of sorbitol, glycerine, polyethylene glycols, mineral oil, and mixtures thereof; from about 0.3 to about 5 percent of a surfactant selected from the group consisting of alkyl sulfate surfactants, ethoxylated alkyl sulfate surfactants and mixtures thereof; and water. The composition has a pH of from about 6 to about 10, is substantially free of polyethylene glycols having fewer than six ethoxy units and short chain monohydric alcohols and has potassium ions present at a level of from about 0.5 to about 7 percent. The soluble pyrophosphate salt can be, for example tetrapotassium pyrophosphate, tetrasodium pyrophosphate, sodium acid pyrophosphate and mixtures thereof.

U.S. Pat. No. 4,806,340 discloses an oral dentifrice composition such as a toothpaste, dental gel, toothpowder, dental tablet or lozenge containing as anticalculus agent about 4.3 to about 7 percent of alkali metal pyrophosphates comprising at least 4.3 percent of tetrapotassium pyrophosphate alone or admixed with up to 2.7 percent of tetrasodium pyrophosphate, and as inhibitors against enzymatic hydrolysis of such agent in saliva, a fluoride and preferably up to about 3 percent of a synthetic anionic polymeric polycarboxylate. The composition is used in a program of oral hygiene and/or for inhibiting dental calculus. It is known that saliva contains acid phosphatase, alkaline phosphatase and pyrophosphatase enzymes. It is considered that any one off the three enzymes may adversely affect pyrophosphates as an inhibitor of hydroxyapatite formation and calculus. It is accordingly apparent that an anticalculus pyrophosphate dentifrice composition, should inhibit, reduce or nullify the destructive activity of all three salivary enzymes. See Also British Published Patent Application No. 2,182,244.

Australian Published Patent Application No. 168071 discloses a dialkali metal-alkaline earth metal pyrophosphate containing about 1 to about 5 percent by weight of chemically combined fluorine. The composition is a dentifrice base. The method of producing the fluorinated dialkali metal-alkaline earth metal pyrophosphate, which comprises reacting together, in the presence of an aqueous medium, a water-soluble metal fluoride, an alkali metal pyrophosphate (such as, tetrasodium pyrophosphate), and a water soluble alkaline earth metal salt. The reactants being employed in the proportions required to yield a dialkali metal-alkaline earth metal pyrophosphate containing about 1 to about 5 percent by weight of chemically combined fluorine.

British Patent No. 777,556 discloses a dentifrice composition which contains a fluoride compound which releases fluoride ions in water, a calcium polyphosphate polishing agent, and a calcium ion suppression agent to maintain the effect of the fluoride upon ageing.

U.S. Pat. No. 4,822,626 discloses a process of producing a biscuit with a baked-on proteinaceous coating. The process includes preparing a dough piece from a dough comprising flour, meal, fat and water; and enrobing the dough piece with a viscous coating formation comprising 10 to 30 weight percent of a dextrin carrier, 10 to 50 weight percent of meat, 10 to 30 weight percent of a glazing agent, 1 to 5 weight percent of polysaccharide gum, 5 to 15 weight percent of a monosaccharide sugar, 5 to 15 weight percent of a disaccharide sugar, and water, all based upon the total dry solids. The dough piece is baked to form a dry biscuit with a baked-on coating. The glazing agent can comprise a gelatin or a modified food starch, and the polysaccharide gum can be a xanthan gum. Biscuits produced by the process and a bakable proteinaceous coating formulation as employed in step (b) are disclosed.

BROAD DESCRIPTION OF THE INVENTION

An object of the invention is to provide nutritionally-balanced dry biscuits containing pyrophosphate. Another object of the invention is to provide a process for preparing nutritionally-balanced dog biscuits containing pyrophosphate. Another object of the invention is to provide a process for the prevention of tartar accumulation on the teeth of dogs. A further object of the invention is to provide a process for the prevention of tartar accumulation on the teeth of dogs by the chewing and eating of nutritionally-balanced dog biscuits containing pyrophosphate by the dogs. Other objects and advantages of the invention are set out herein or are obvious herefrom to one skilled in the art.

The objects and advantages of the invention are achieved by the compositions and processes of the invention.

The invention involves a process for preparing dog biscuit dough which is nutritionally balanced and which contains at least one inorganic pyrophosphate. The process includes admixing the ingredients of the dog biscuit dough and the at least one inorganic pyrophosphate. The ingredients and the at least one inorganic pyrophosphate are selected and adjusted in amounts which provide a nutritional balance. The inorganic pyrophosphate also reduces the accumulation of tartar on the teeth of dogs.

Tartar is an incrustation of the teeth consisting of salivary secretion, food residue and various salts, such as, calcium carbonate or phosphate. Tartar is also termed dental calculus.

Caries are cavities or decay of the teeth which begins at the surface of the tooth and may progress through the dentine into the pulp cavity. It is believed that the action of microorganisms in the mouth on ingested sugars and carbohydrates produces acids that eat away the enamel. By preventing the formation of calculus or tartar, the invention formulation is in effect an anti-cariogenic agent.

Preferably the dry dough ingredients and the inorganic pyrophosphate salts are mixed, then water is added and the mixing continued, and finally the fat (tallow) is added and thoroughly mixed in.

The dog biscuits can be made from any suitable dough. In one advantageous embodiment, a bone-shaped canine biscuit is provided which is baked from a dough comprising wheat flour, wheat meal, soybean meal, meat and bone meals, animal fat and water. The baked dog biscuit has an overall moisture content of 13 weight percent or less.

The compositions of the dog biscuit doughs are modified as described herein to provide nutritionally-balanced dog biscuits.

The invention also involves dog biscuit dough which is nutritionally balanced and which contains at least one inorganic pyrophosphate. Generally, the invention dog biscuit dough contains: about 0.1 to about 7 weight percent of Ca, about 0.08 to about 6 weight percent of P, about 0.05 to about 3 weight percent of K, about 0.1 to about 3 weight percent of Na and about 0.15 to about 4.5 weight percent of $Cl^-$, preferably about 0.5 to about 4 weight percent of Ca, about 0.4 to about 3 weight percent of P, about 0.15 to about 3 weight percent of K, about 0.2 to about 2.0 weight percent of Na and about 0.3 to about 3 weight percent of $Cl^-$; and most preferably about 1.0 to about 2.5 weight percent of Ca, about 0.8 to about 2.0 weight percent of P, about 0.25 to about 2.0 weight percent of K, about 0.3 to about 1.0 weight percent of Na and about 0.45 to about 1.5 weight percent of $Cl^-$. The above weight percentages are based upon the entire weight of the dog biscuit doughs (or unbaked dog biscuits or baked dog biscuits), assuming a water content of 10 weight percent for these calculations. Preferably the ratio of Ca to P is between about 1.0:1 and about 1.6:1, and most preferably the ratio of Ca to P is between about 1.1:1 and about 1.4:1.

One of the keys to the invention is the selection and adjustment in amounts of the dog biscuit dough ingredients and the at least one inorganic pyrophosphate salt to provide a nutritional balance.

The dog biscuit dough preferably contains about 0.1 to about 10 weight percent of the at least one inorganic pyrophosphate compound, and most preferably about 0.5 to about 5 weight percent of said at least one inorganic pyrophosphate compound. The preferred inorganic pyrophosphate salt(s) is an alkali metal pyrophosphate. Most preferably the dog biscuit dough contains a combination of sodium acid pyrophosphate and tetrapotassium pyrophosphate.

The invention also involves a process for preparing unbaked dog biscuits from the dog biscuit dough. The invention also involves unbaked dog biscuits which are nutritionally balanced and which contain at least one inorganic pyrophosphate. The dog biscuit pieces preferably are bone shaped. The unbaked dog biscuits have a moisture content usually in the range of about 25 to about 40 weight percent, preferably about 33 to about 35 weight percent.

The invention also involves a process for preparing baked dog biscuits which are nutritionally balanced and which contain at least one inorganic pyrophosphate. The process includes:

(a) shaping a dog biscuit dough, which is nutritionally balanced and which contains the at least one inorganic pyrophosphate, into dog biscuit pieces comprising unbaked dog biscuits; and (b) baking the unbaked dog biscuits. The baked dog biscuits can be dried, if necessary, to obtain the desired moisture level. The baked dog biscuits should have a moisture content of 13 weight percent or less, advantageously between about 5 and 13 weight percent, and preferably between about 8 and about 12 weight percent. The invention product is baked so that it comprises a baked dog biscuit which is nutritionally balanced and which contains at least one inorganic pyrophosphate.

The invention further involves baked dog biscuits which are nutritionally balanced and which contain at least one inorganic pyrophosphate. The ingredients, ratios, ranges, etc., for the invention dog biscuit dough applies to the invention baked dog biscuits except as otherwise noted herein.

The invention product preferably should be slightly acid to neutral.

The inorganic pyrophosphates are anti-tartar, anti-plaque or anti-calculus agents. The invention product exhibits anti-tartar properties over its normal shelf life.

The invention product does not adversely affect canine tooth enamel.

The invention further involves a process for the prevention or reduction of tartar accumulation on the teeth of dogs. The process includes the chewing and/or eating of the invention baked dog biscuits by the dogs. The term "dog biscuit" herein means a baked dog biscuit unless otherwise stated herein or otherwise obvious herefrom to one skilled in the art.

The invention biscuits, when eaten and chewed by dogs, cleans teeth surfaces, removes tartar (by mechanical action), and exercises and massages the gums. The pyrophosphate in the invention biscuits prevents or reduces the formation of tartar on the dog's teeth. The pyrophosphate, in the levels involved, does not adversely affect the gastrointestinal system or the health of the dogs.

DETAILED DESCRIPTION OF THE INVENTION

As used herein, all parts, percentages, ratios and proportions are on a weight basis unless otherwise stated herein or otherwise obvious herefrom to one skilled in the art. As used herein, all temperatures are in degrees Fahrenheit unless otherwise stated herein or otherwise obvious herefrom to one skilled in the art.

The dog biscuits can be made from any suitable dough, which is modified as described herein to provide nutritionally-balanced dog biscuits containing pyrophosphate.

Any suitable dough comprising at least one flour, meal, fat and water can be employed for the product. For instance, when the desired product is a canine biscuit, a conventional dough for dog biscuits can be used, optionally containing discrete particles of meat and/or meat byproducts or farinaceous material. Such doughs typically contain fat solids. Examples of suitable doughs for the production of hard dog biscuits are disclosed in U.S. Pat. No. 4,454,163, and suitable doughs for the production of soft dog biscuits (containing humectant to control water activity) are disclosed in U.S. Pat. No. 4,454,164. The pertinent portions of U.S. Pat. Nos. 4,454,163 and 4,454,164 are incorporated herein by reference. Particulate proteinaceous particles, such as particles of meat, texturized vegetable protein and/or meat byproducts can be incorporated to add flavor to the biscuits and texturize the surface. Particulate farinaceous materials such as bran particles can also be employed to texturize the interior and/or surface of the biscuits and to provide other useful properties to the product. A dough found to produce biscuits highly palatable to dogs includes suitable proportions of wheat flour, wheat meal, soybean meal, meat and bone meal, animal fat and natural flavors in admixture with water. The meal used in the doughs suitable for production of biscuits useful in the invention can comprise meat and/or bone and/or vegetable matter including farinaceous materials, materials prepared from legumes such as beans and peas, tuberous materials such as potato meal, and the like. The meals can be finely or coarsely ground as desired for the texture. Flours made from any suitable farinaceous material can be used.

The doughs generally have a water activity of about 0.90 and above upon completion of mixing of the dough ingredients. A suitable dough contains farinaceous material, an edible oil, an antioxidant, an antimycotic, salt, animal fat, added vitamins and minerals, such as those disclosed in U.S. Pat. No. 4,229,485, column 5, lines 7 to 57, which is incorporated herein by reference. The compositions of the invention also preferably contain at least one animal-derived proteinaceous meal such as meat meal, bone meal and fish meal. A good biscuit dough for producing the biscuits of the invention contains about 50 to 60 percent by weight wheat flour, about 5 to 10 percent by weight soybean meal, about 3 to 10 percent by weight meat and bone meal, about 1 to 5 percent wheat meal, about 1 to 5 percent animal fat preserved with BHA, about 20 to 30 percent by weight water, and about 2 to 5 percent by weight of natural flavors, vitamin and mineral preblend, and acidulant.

The dog biscuit doughs are modified as described herein to provide nutritionally-balanced dog biscuits.

The solvent used in preparing the dog biscuit dough is preferably water, but other non-toxic, edible solvents, such as, ethanol or ethanol/water, can be used. The problem of the necessity of solvent removal from the dough due to toxicity is to be avoided in most cases. If a mixture of ethanol and water is used, the amount of ethanol in the mixture is generally about 5 to about 60 percent, preferably about 5 to about 25 percent. When one or more of the inorganic pyrophosphates is not water soluble, it may be ethanol soluble.

The invention includes the use of at least one inorganic pyrophosphate. Preferably the inorganic pyrophosphates are water soluble. A mixture of inorganic pyrophosphates can be used to help secure a nutritional balance and can be used to provide a desired pH. The use of water-insoluble or difficultly soluble inorganic pyrophosphates in a dog biscuit dough is not a significant problem compared to use of such materials in a solution, such as, a mouth wash.

The pH of the dough can be adjusted using an inorganic base (e.g., KOH, NaOH, CaOH, LiOH, MgOH, etc.) or an inorganic acid (e g , $H_2SO_4$, HCl, etc.), but this approach has the disadvantages of possibly causing a misbalance or overabundance of one or more chemical entities and possibly introducing unwanted salts.

Generally 0.1 to 10 weight percent, preferably about 0.5 to about 3.5 weight percent and preferably about 1.4 to about 2.5 weight percent of inorganic pyrophosphate is used.

When a mixture of tetrasodium pyrophosphate (TSPP) and sodium acid pyrophosphate in aqueous solution at the 5 weight percent level was incorporated in dog biscuit dough, there was reduced dough gluten development, the dog biscuits were bleached (whitish) and crumbly, and the dog biscuits were softer (a hardness problem) than the control dog biscuits. Also, such dog biscuits had nutrition problems. At the level of 3 weight percent of a mixture of tetrasodium pyrophosphate and sodium acid pyrophosphate, the same problems occurred, but less severely. The addition of the inorganic pyrophosphates in dry form to the dry ingredients in the dough preparation basically eliminated the above problems (except for the nutrition problem). It was also found that better results were secured by using the inorganic phosphates in powder form as opposed to granular form.

The inorganic pyrophosphates are preferably alkali metal pyrophosphates. The preferred alkali metal pyrophosphates are tetrasodium pyrophosphate and tetrapotassium pyrophosphate. An example of useful a tetraalkali metal pyrophosphate is tetralithium pyrophosphate. Alkaline earth metal pyrophosphates are also useful, but they are generally insoluble in water. Preferably the inorganic pyrophosphates are soluble in water.

Kirk & Othmer, "Encyclopedia Of Chemical Technology", 2nd Ed., Vol. 15, (1965), pages 232 to 276, discloses a number of water-soluble inorganic pyrophosphate salts. The pertinent portions of Kirk & Othmer, "Encyclopedia Of Chemical Technology", 2nd Ed., Vol. 15, (1965), pages 232 to 276, are incorporated herein by reference.

Examples of dialkaline metal pyrophosphates are dicalcium pyrophosphate, dibarium pyrophosphate and dimagnesium pyrophosphate. Trialkali metal monoacid pyrophosphates, such as, trisodium hydrogen pyrophosphate (SAPP), can be used. Monoalkali metal triacid pyrophosphates, such as, sodium trihydrogen pyrophosphate, can also be present in limited amounts. Examples of other inorganic pyrophosphates include manganese pyrophosphate and dizinc pyrophosphate.

The formula $M_{n+2}P_nO_{3n+1}$, where M is a univalent metal, is the formula for univalent metal pyrophosphates when n is 2. The formula $M'_nP_nO_{3n+1}$, where M' is a divalent metal, is the formula for divalent metal pyrophosphates when n is 2. Such univalent metal pyrophosphates and divalent metal pyrophosphates can be used in the invention. Polyphosphates have the formula $M_{n+2}P_nO_{3n+1}$ or $M'_nP_2O_{3n+1}$, where n is 2, 3, 4, 5, . . ., and the oxide ratio R between the cationic oxides ($M_2O$ or $M'O$) and anionic oxides ($P_2O_5$) is between 1 and 2. The oxide ratio for pyrophosphate is 2.

Tetrasodium pyrophosphate, one part, is soluble in 13 parts of cold water and in 2.5 parts of boiling water. It is insoluble in ethanol. Dicalcium pyrophosphate is practically insoluble in water. The invention use of the term "solution" includes slurries, suspensions and the like. Tetrapotassium pyrophosphate is freely soluble in water and is insoluble in ethanol.

Most preferably a mixture of sodium acid pyrophosphate and tetrapotassium pyrophosphate is used (in a ratio to achieve the desired nutritional delivery and the desired pH). In such most preferred mixture, tetrasodium pyrophosphate is not used as it would provide too much sodium in the nutritionally-balanced composition.

The maximum allowable GRAS level in the U.S. in a composition for sodium acid pyrophosphate (SAPP) is 2.1 weight percent and tetrapotassium pyrophosphate (TKPP) is 1.4 weight percent in baked goods. If GRAS levels change (rise) or if higher levels are allowed by the regulatory agencies, higher levels can be used in the invention. TKPP delivers approximately 52.65 percent of $P_2O_7$; SAPP delivers about 78.36 percent of $P_2O_7$; and TSPP delivers about 65.4 percent of $P_2O_7$.

With the total amount of Na and Cl in the dog biscuit dough (or baked dog biscuit) being taken as 100 weight percent, preferably the Na content ranges between about 30 and about 50 weight percent and the $Cl^-$ content ranges between about 50 and about 70 weight percent, and most preferably the Na content is about 40 to about 44 weight percent and the $Cl^-$ content is about 60 to about 56 weight percent.

The pyrophosphate(s) is used in sufficient amount to deliver generally from about 0.1 to about 5, preferably from about 0.5 to about 3.5 weight percent, most preferably 1.4 to 2.5 weight percent (based on the total composition), of $P_2O_7$. The use of 3.5 weight percent of inorganic pyrophosphate salt(s) means the delivery of about 2.5 weight percent of $P_2O_7$.

A study of the application of aqueous solutions of a mixture of tetrasodium pyrophosphate and sodium acid pyrophosphate to the teeth of dogs by spraying for one month resulted in dose response data. The aqueous solutions containing 5 and 3 weight percent of a mixture of tetrasodium pyrophosphate and sodium acid pyrophosphate resulted in significant reductions in tartar accumulation. The aqueous solutions containing 1.5 and 0.5 weight percent of a mixture of sodium acid pyrophosphate and tetrasodium pyrophosphate resulted in directional trends of reductions in tartar accumulation. See also U.S. Pat. No. 3,323,551.

The ratio of sodium acid pyrophosphate (SAPP) to tetrapotassium pyrophosphate (TKPP) is generally between 4 to 1 and 3 to 7, preferably between 7 to 3 and 1 to 1, most preferably about 3 to about 2. SAPP has a pH of 4.2 and TKPP (and TSPP) has a pH of 10.2, so the combination of SAPP and TKPP (or TSPP) provides a resultant pH which is a balance of the pHs of the two components.

The pH of the dough containing at least one inorganic pyrophosphate salt (and baked dog biscuit) is generally in the range of about 4 to about 10.5, typically from about 4.5 to about 7.5, preferably from about 5 to about 7, most preferably between about 5.6 and about 6.1. Milk Bone ® dog biscuit has a pH of 6.1 to 6.4. Tartar reduction is indicated to be best at neutral pH and palatability is indicated to be best at a slightly acidic pH, so the best mode contemplates a balance of such two factors in any commercial product.

The dough ingredient is generally mixed at a temperature of about 45° to about 140° F., preferably about 60° to about 125° F.

The nutritionally-balanced dog biscuit dough generally contains about 0.1 to about 7 weight percent of Ca, about 0.08 to about 6 weight percent of P, about 0.05 to about 3 weight percent of K, about 0.1 to about 3 weight percent of Na and about 0.15 to about 4.5 weight percent of $Cl^-$. The nutritionally-balanced dog biscuit dough preferably contains about 0.5 to about 4 weight percent of Ca, about 0.4 to about 3 weight percent of P, about 0.15 to about 3 weight percent of K, about 0.2 to about 2 weight percent of Na and about 0.3 to about 3 weight percent of $Cl^-$, and most preferably contains about 1.0 to about 2.5 weight percent of Ca, about 0.8 to about 2.0 weight percent of P, about 0.25 to about 2.0 weight percent of K, about 0.3 to about 1.0 weight percent of Na and about 0.45 to about 1.5 weight percent of $Cl^-$. The above weight percentages are based upon the entire weight of the dog biscuit doughs (or unbaked dog biscuits or baked dog biscuits), assuming a water content of 10 percent for these calculations. Minor nutritional elements can also be adjusted as desired.

The invention is in line with the nutritional requirements of dogs for maintenance as regards calcium, phosphorus, potassium, sodium and chlorine. Examples 7 and 8 are also nutritionally complete with regard to micronutrients. Puppies need high Ca and P for growth. Milk Bone ® dog biscuits are nutritionally balanced.

The ratio of Ca to P in the nutritionally-balanced dog biscuit dough is generally, preferably between about 1.0:1 and about 1.6:1, and most preferably between about 1.2:1 and about 1.4:1.

The critical factor in the prevention or reduction of tartar accumulation is the pyrophosphate moiety. The nutritional balance partially depends upon the amounts and ratios of elements and ions, such as Ca, P, K, Na and $Cl^-$. The reason that it is best to use tetrapotassium pyrophosphate, instead of tetrasodium pyrophosphate, with sodium acid pyrophosphate is that such action holds down the sodium level in the dough.

In order to provide sufficient calcium to achieve nutritional balance, calcium carbonate and calcium chloride are included in the preferred invention formula. It is advantageous to use calcium chloride (to raise the chlorine level) and a high level of calcium carbonate instead of the dicalcium phosphate and the low level of calcium carbonate used in Milk Bone ® dog biscuits. Also, since the invention uses pyrophosphates, the P level could be too high if dicalcium phosphate is also used. The calcium chloride supplies $Cl^-$ to help achieve nutritional balance. The calcium chloride can be replaced by dicalcium pyrophosphate (with a corresponding adjustment of the other pyrophosphate salts and possible addition of another chlorine source). The bone meal level in Milk Bone ® dog biscuits has been lowered in the preferred invention formula.

The invention biscuits do not include the salt present in Milk Bone ® dog biscuits.

The dough can also contain suitable surfactants or emulsifying agents, best used in minor amounts.

The dog biscuit dough can be mixed using any suitable or conventional equipment. For example, the mixing can be at 20 to 100 rpm. For example, a dry blending step (dries and the inorganic pyrophosphates) can be done typically at room temperature for a period of time of about 3 minutes to about 20 minutes. The dry-blended mixture can then be mixed with the hot water to form a first stage dough. The water which can be admixed with the dry-blended mixture is typically at a temperature of about 65° to about 150° F. The hot water can be added, with mixing, over a period of time of about 3 minutes to about 6 minutes to form the first stage dough. Then, the fat portion of the biscuit dough can be admixed with the first stage dough to form the final stage dough. The fat portion can be added at a temperature at which it is at least fluid, typically at about 100° to about 150° F. The fat portion can be mixed for a period of time which is sufficient to form a dough whose homogeneity is visually apparent. A typically final mixing time is about 3 to about 5 minutes.

Initially, there were machinability and dough structure property problems with the invention dough, but the addition of water solved such problems. But the use of the higher water levels caused the dough to be so sticky as to cause problems in a sigma or rotary mixer (but it is normally not a significant problem in a continuous mixer). The addition of more tallow to the dog biscuit dough assisted in more effective mixing and helped to keep the dough from being so sticky that it clings to the rotary molder. Preferably the tallow level is about 2.6 to about 3.1 weight percent (most preferably about 2.85 weight percent), as opposed to a tallow level of about 2.46 weight percent in Milk Bone ® dog biscuits. Also, the tallow provides a taste which dogs like.

Formation of the dough is achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water can be added simultaneously and mixed for 6 to 10 minutes.

The dog biscuits are formed in any conventional or suitable manner, such as, by extrusion, stamping, cutting or molding. Any suitable dog biscuit shapes can be used, such as, a bone-shaped canine biscuit. For many products, such as, the bone-shaped canine biscuits of the invention, a rotary molding system is preferred because it permits the rapid forming of dough pieces with good control over their shape, form and surface characteristics. Docker holes are preferably formed in the dough piece during molding to facilitate the escape of moisture during baking.

The dough can then be formed into pieces by machining on a rotary molder with specific die shapes. The dough can also be formed into pieces by sheeting followed by either a vertical or rotary cutter or by a rotary molder. Suitable die and cutter shapes are those which result in a round, square, triangular, T-bone or chop-shaped biscuit product and the like. The forming is achieved at conventional temperatures of ambient to 110° F. and pressures of less than 75 p.s.i. (gauge), used with a rotary molder, a vertical cutter or rotary cutter.

The dough pieces can be baked using any suitable or conventional equipment and conditions. For example, the dough pieces can be passed into an oven such as a conventional band oven where the biscuit is baked. The conveyer belts of the oven can be coated with an edible lubricant such as a natural or synthetic cooking oil or shortening to facilitate separation from the conveyer belts of the baked products. Temperatures in the range of about 300° to about 600° F. can be used. The baked biscuits can also be subjected to subsequent drying at temperatures of about 200° to 400° F., either within the baking oven or separately, to produce the desired moisture content in the final product.

The formed pieces are baked, followed by drying, to achieve a shelf stable product without the need of any moisture barrier protection. Baking and drying temperatures and times are those conventionally used in the production of a hard, dry canine biscuit. The pieces are dried to obtain a biscuit having a water activity of 0.70 or less. Typically, baking temperatures and times are about 300° F. to about an average of 475° F. for about 25 minutes to about 8 minutes. Drying conditions are typically about 200° to about 325° F. for about 25 minutes to about 12 minutes in a forced air dryer. On a weight basis, the moisture content of the final biscuit product is less than or equal to 13 percent by weight, usually at least 5 weight percent, and most preferably about 8 to about 12 percent by weight, of the final biscuit at 70 percent relative humidity.

The ingredients, pH and ranges for the invention dough are the same for the invention dog biscuits.

The invention product is similar as palatable as Milk Bone ® dog biscuits, which have been widely accepted and a commercial success for many years.

The invention product does not include any fluorine-containing compound or other fluoride ion source, or quaternary ammonium compounds. Also the invention product does not include any organic pyrophosphates.

The invention deals primarily with dogs, but has a scope of teeth-bearing non-human mammals, such as, cats.

The invention composition is used to reduce and control tartar accumulation on canine teeth. Based upon the weight of commercial Milk Bone ® biscuits: 12 small invention dog biscuits per day, 10 medium invention dog biscuits per day, 6 large invention dog biscuits per day or 4 extra large invention dog biscuits per day will supply about ¼ to ⅓ of a dog's caloric requirement.

The following table sets out the content of nutritionally important elements and ions in various dog biscuits:

TABLE 1

| Elements Or Ions | Milk Bone ® Dog Biscuits Wt. Percent | 1.6% Pyrophoshate Example 8a Dog Biscuits Wt. Percent | 2.34% Pyrophosphate Example 7 Dog Biscuits Wt. Percent |
|---|---|---|---|
| Ca | 1.21 | 1.581 | 1.843 |
| P | 0.978 | 1.333 | 1.585 |
| K | 0.846 | 1.105 | 1.252 |
| Na | 0.413 | 0.488 | 0.516 |
| Cl | 0.524 | 0.651 | 0.662 |

NOTES:
1. Milk Bone ® is a registered trademark of Nabisco Brands, Inc. for canine biscuits.
2. The ratio of Ca to P is 1.1-1.2 to 1 in Milk Bone ® canine biscuits.
3. The weight percentages are based on the final canine biscuits having a moisture content of 10 percent.
4. The Examples 7, 8a and 8b formulas are the most preferred compositions.

It is most preferred to have a chlorine content of about 40 to 44 weight percent and a Na content of about 60 to about 56 weight percent, based on the total weight of Na and Cl in the dog biscuit. The most preferred calcium/phosphorus ratio of 1.1-1.4:1 is best for growth and maintenance.

The following is a summary of experiments described in more detail below:

Example 1: Initial testing of solutions of pyrophosphates. Solutions were applied directly to teeth.

Example 2: Addition of pyrophosphate (5 percent delivered) to Milk Bone ® formula.

Example 3: Dose response study. Pyrophosphate at 0.5, 1.5, 3.0 and 5.0 percent delivered were added to the Milk Bone ® formula.

Example 4: Base line formula. Used to determine the effects of pyrophosphate on the nutritional aspects of Milk Bone ® formula.

Example 5: 2.57 percent pyrophosphate delivery. This formula was modified to balance calcium and phosphorus ratio (eliminated dicalcium phosphate and bone meal, and increased calcium carbonate).

Example 6: 2.34 percent pyrophosphate delivery. This formula was modified to balance sodium and chloride (substituted TKPP for TSPP, eliminated salt, added CaCl2 and reduced CaCO3).

Example 7: Same as Example 6, but with increased tallow (and increased water).

Example 8: Lower pyrophosphate delivery (1.6 percent pyrophosphate) than Example 8.

Examples 2 to 8 are based upon modifications of the formula of Milk Bone ® dog biscuits.

TABLE 2

TARTAR CONTROL BISCUITS
SUMMARY OF FORMULA DEVELOPMENT

| INGREDIENTS | CONTROL REGULAR MILK BONE ® Lbs. | EX. 2 5% PYRO-PHOSPHATE Lbs. | EX. 3 DOSE STUDY Lbs. | EX. 4 BASELINE FORMULA Lbs. | EX. 5 FORMULA #3 2.5% PYRO. Lbs. | EX. 6 FORMULA 4A 2.3% PYRO. Lbs. | EX. 7 FORMULA 4B 2.34% PYRO. Lbs. |
|---|---|---|---|---|---|---|---|
| Flour | 940.000 | 940.000 | SEE EXAMPLE NO. 3 | 940.000 | 940.000 | 940.000 | 940.000 |
| Soybean Meal | 135.000 | 135.000 | | 135.000 | 135.000 | 135.000 | 135.000 |
| Meat & Bone Meal | 100.000 | 100.000 | | 100.000 | 100.000 | 100.000 | 100.000 |
| Wheat Meal | 40.000 | 40.000 | | 40.000 | 40.000 | 40.000 | 40.000 |
| Tallow | 32.000 | 32.000 | | 32.000 | 32.000 | 32.000 | 37.000 |
| Salt | 10.000 | 10.000 | | 10.000 | 10.000 | 0 | 0 |
| Dicalcium Phosphate | 8.500 | 8.500 | | 8.500 | 0 | 0 | 0 |
| Natural Flavorants | 17.000 | 17.000 | | 17.000 | 17.000 | 17.000 | 17.000 |
| Bone Meal | 5.000 | 5.000 | | 5.000 | 0 | 0 | 0 |
| Calcium Carbonate | 2.000 | 2.000 | | 2.000 | 37.000 | 25.000 | 25.000 |
| Dough Conditioners | 2.875 | 2.875 | | 2.875 | 2.875 | 2.875 | 2.875 |
| Vitamin Premix | 0.375 | 0.375 | | 0.375 | 0.375 | 0.375 | 0.375 |
| Tetrasodium Pyrophosphate | 0 | 70.280 | | 18.800 | 19.000 | 0 | 0 |
| Sodium Acid Pyrophosphate | 0 | 23.450 | | 28.200 | 28.500 | 27.000 | 27.000 |
| Tetrapotassium Pyrophosphate | 0 | 0 | | 0 | 0 | 18.000 | 18.000 |
| Calcium Chloride | 0 | 0 | | 0 | 0 | 13.500 | 13.500 |
| TOTAL | 1,292.750 | 1,386.48 | | 1,339.750 | 1,375.250 | 1,350.750 | 1,355.25 |

Note:
1. Example 7 represents a preferred formula having 2.34 weight percent of pyrophosphate.

EXAMPLE #1

Solution Tests

Purpose

To determine the dose response of three concentrations of an anti-tartar agent (pyrophosphate) to reduce accumulation of tartar formation in the dog.

Test Design
Treatment
  DI H2O - Control
  3.3% Pyrophosphate
  5.0% Pyrophosphate
  6.7% Pyrophosphate
Test Solutions

| Formulas | | |
|---|---|---|
| Tetrasodium Pyrophosphate (TSPP) | Sodium Acid Pyrophosphate (SAPP) | % Delivered Pyrophosphate |
| 3.58 grams | 1.22 grams | 3.3 |
| 5.42 grams | 1.85 grams | 5.0 |
| 7.27 grams | 2.48 grams | 6.7 |

The above pyrophosphates were mixed with 100 ml of DI H2O. The test solutions were applied to the teeth using a modified syringe. The ratio of the above blends of TSPP and SAPP is: TSPP-75 percent, SAPP-25 percent.

Results

A significant reduction in tartar accumulation was shown with the 5 percent pyrophosphate solution.

EXAMPLE #2

Pilot Plant Study With Milk Bone ®

Containing 5 Percent of Deliverable Pyrophosphate

Purpose

The addition of pyrophosphate to Milk Bone ® dog biscuits.

Test

Tetrasodium pyrophosphate (TSPP) and sodium acid pyrophosphate (SAPP) were used. The ratio of the pyrophosphates was 75 percent of TSPP and 25 percent of SAPP. The level of TSPP was 5.1 percent and SAPP was 1.69 percent of the formula weight—which delivers approximately 5.0 percent of pyrophosphate. The TSPP and SAPP dissolved in water were just added to the total weight of the regular Milk Bone ® formula. No other formula adjustments were made so that the effects of the pyrophosphates could be determined.

The study originally was designed to test Milk Bone ® with 5.0, 7.5 and 10.0 percent of deliverable pyrophosphate. At the 7.5 and 10.0 percent levels, acceptable biscuits could not be rotary molded. The finished product produced was extremely soft and had distorted shapes. Biscuits with 5.0 percent of pyrophosphate were borderline acceptable. The color of the biscuits were whitish in color, whereas the control biscuits are tan/beige in color.

Due to the addition of TSPP and SAPP, the calcium and phosphorus ratio is not in balance. It was decided that lower levels (below 5 percent) would be evaluated in Milk Bone ® biscuits.

Results

A significant reduction in the accumulation of tartar was seen at the 5 percent pyrophosphate level. There was a significant amount of breakage (30 to 35 percent) with the 5 percent pyrophosphate biscuits.

Additional Information pH of biscuits:
Control Milk Bone ®- 6.15
5 percent of pyrophosphate Milk Bone ®- 6.98

EXAMPLE #3

Pilot Plant Dose Response Study

Purpose

To establish a dose level which is effective for tartar control.

Test

The TSPP and SAPP solutions were added to the weight of the regular Milk Bone° formula. No other formula adjustments were made so that the effect of the pyrophosphates could be determined. The pyrophosphates were dissolved in water (135° to 140° F.) and added to the Milk Bone ® dries. Regular medium Milk Bone ® and four medium Milk Bone ® test products were made. Each of the test products contained different levels, 0.5, 1.5, 3.0 and 5.0 percent of deliverable pyrophosphates. The ratio of the blend of tetrasodium pyrophosphate (TSPP) and sodium acid pyrophosphate (SAPP) was:

| TSPP - 75% | for all four levels |
|---|---|
| SAPP - 25% | |

The total amounts of TSPP and SAPP added to the formula and approximate delivered soluble pyrophosphate ($P_2O_7$) were:

|  | % | % | % | % |
|---|---|---|---|---|
| (75%) TSPP added - | 0.54 | 1.60 | 3.17 | 5.10 |
| (25%) SAPP added - | 0.18 | 0.53 | 1.10 | 1.69 |
| Total | 0.72 | 2.13 | 4.27 | 6.79 |
| Approx. delivery of soluble pyrophosphate | 0.5% | 1.5% | 3.0% | 5.0% |

Pilot Plant Trials

The doughs containing 0.5 and 1.5 percent of delivered pyrophosphates were similar in development to control regular Milk Bone ® dog biscuits. However, the doughs with the 3 and 5 percent levels were shorter in texture and not as developed as the control. The finished products at these two levels were less hard than the control biscuits.

pH - of Biscuits (10% solution)
Regular Milk Bone ® - 6 10
0.5% biscuits - 6.41
1.5% biscuits - 6.75
3.0% biscuits - 6.88
5.0% biscuits - 7.07

Results of the Study

| Pyrophosphate Delivery | Results |
|---|---|
| 0.5% Milk Bone ® biscuits | No significant reduction in tartar accumulation - directional trend |
| 1.5% Milk Bone ® biscuits | No significant reduction in tartar accumulation - directional trend |
| 3.0% Milk Bone ® biscuits | A significant reduction in tartar accumulation |
| 5.0% Milk Bone ® biscuits | A significant reduction in tartar accumulation |

A significant amount of breakage (approx. 25 percent) was reported for the 5 percent pyrophosphate biscuits. There was approximately 15 percent breakage with the 3 percent level. At the 0.5 and 1.5 percent of pyrophosphate levels, the breakage was not considered excessive compared to the control biscuits.

Test data and results are set out in the following table:

TABLE 3

REGULAR MILK BONE ®/PYROPHOSPHATE/TARTAR CONTROL DOSE RESPONSE STUDY

| INGREDIENTS | CONTINUOUS MIX CONTROL LBS | PERCENT | PYROPHOSPHATE .50% Lbs. | PERCENT | PYROPHOSPHATE 1.50% Lbs. | PERCENT | PYROPHOSPHATE 3.0% Lbs. | PERCENT | PYROPHOSPHATE 5.0% Lbs. | PERCENT |
|---|---|---|---|---|---|---|---|---|---|---|
| Flour | 940.00 | 72.7132 | 940.00 | 72.1855 | 940.00 | 71.1604 | 940.00 | 69.6797 | 940.00 | 67.7976 |
| Soy Meal | 135.00 | 10.4429 | 135.00 | 10.3671 | 135.00 | 10.2198 | 135.00 | 10.0072 | 135.00 | 9.7369 |
| Meat & Bone Meal | 100.00 | 7.7354 | 100.00 | 7.6793 | 100.00 | 7.5703 | 100.00 | 7.4127 | 100.00 | 7.2125 |

TABLE 3-continued

REGULAR MILK BONE ®/PYROPHOSPHATE/TARTAR CONTROL DOSE RESPONSE STUDY

| INGREDIENTS | CONTINUOUS MIX CONTROL LBS | PER-CENT | PYRO-PHOSPHATE .50% Lbs. | PER-CENT | PYRO-PHOSPHATE 1.50% Lbs. | PER-CENT | PYRO-PHOSPHATE 3.0% Lbs. | PER-CENT | PYRO-PHOSPHATE 5.0% Lbs. | PER-CENT |
|---|---|---|---|---|---|---|---|---|---|---|
| Wheat Meal | 40.00 | 3.0942 | 40.00 | 3.0717 | 40.00 | 3.0281 | 40.00 | 2.9651 | 40.00 | 2.8850 |
| Tallow | 32.00 | 2.4753 | 32.00 | 2.4574 | 32.00 | 2.4225 | 32.00 | 2.3721 | 32.00 | 2.3080 |
| Salt | 10.00 | 0.7735 | 10.00 | 0.7679 | 10.00 | 0.7570 | 10.00 | 0.7413 | 10.00 | 0.7213 |
| Dicalcium Phosphate | 8.50 | 0.6575 | 8.50 | 0.6527 | 8.50 | 0.6435 | 8.50 | 0.6301 | 8.50 | 0.6131 |
| Natural Flavorants | 17.00 | 1.3157 | 17.00 | 1.3056 | 17.00 | 1.2869 | 17.00 | 1.2601 | 17.00 | 1.2261 |
| Bone Meal | 5.00 | 0.3868 | 5.00 | 0.3840 | 5.00 | 0.3785 | 5.00 | 0.3706 | 5.00 | 0.3606 |
| Calcium Carbonate | 2.00 | 0.1547 | 2.00 | 0.1536 | 2.00 | 0.1514 | 2.00 | 0.1483 | 2.00 | 0.1443 |
| Dough Conditioners | 2.875 | 0.2224 | 2.875 | 0.2208 | 2.875 | 0.2176 | 2.875 | 0.2132 | 2.875 | 0.2074 |
| Vitamin Premix | 0.375 | 0.0290 | 0.375 | 0.0288 | 0.375 | 0.0284 | 0.375 | 0.0278 | 0.375 | 0.0270 |
| Tetrasodium Pyrophosphate | 0 | 0 | 7.07 | 0.5429 | 21.14 | 1.6003 | 42.210 | 3.1289 | 70.28 | 5.0689 |
| Sodium Acid Pyrophosphate | 0 | 0 | 2.38 | 0.1828 | 7.07 | 0.5352 | 14.070 | 1.0430 | 23.45 | 1.6913 |
| TOTAL | 1,292.75 | | 1,302.2 | | 1,320.96 | | 1,349.03 | | 1,386.48 | |

EXAMPLE 4

TSPP AND SAPP added at appropriate ratio and levels

No other formula changes were made

Purpose

The formula serves as a base line formula to determine the effects of TSPP and SAPP on the nutritional aspects of the formula. The nutritional data was generated by a computer program. It was determined that the FDA generally recognized as safe (GRAS) status for sodium acid pyrophosphate in baked goods is a maximum level of 2.1 percent and 1.4 percent for tetrasodium pyrophosphate, therefore, the levels and ratios of TSPP and SAPP had to be changed.

Changes

The original ratio of TSPP (75 percent) and SAPP (25 percent) was changed to:

SAPP - 60%
TSPP - 40%

To achieve maximum delivery of pyrophosphates the maximum GRAS allowed levels are used. At these levels the above ratios are required. TSPP and SAPP were incorporated into the regular Milk Bone ® formula—no other changes were made.

Using the allowed maximum levels (TSPP 1.4 percent and SAPP 2.1 percent) and the new ratios of 60 percent SAPP and 40 percent TSPP the following nutritional data was generated on a computer program.

Results

Nutritional data:

| Calcium - | 1.159% | 1.0 to 1.629 Ratio |
|---|---|---|
| Phosphorus - | 1.888% | |
| Potassium - | 0.813% | |
| Sodium - | 1.352% | |
| Chloride - | 0.504% | |

The calcium and phosphorus ratio per the National Research Council (NRC) requirements is 1.1:1.4 to 1. In this base line formula the ratio is reversed, i.e., phosphorus 1.629 to calcium 1.0. The sodium was high.

Total amount of TSPP and SAPP added = 3.5%

Soluble pyrophosphate delivery = 2.5%

EXAMPLE 5

2.57% Soluble Pyrophosphate Delivery Pilot Plant Study

Purpose

To modify formula to balance calcium and phosphorus ratio. To evaluate the effect of adding TSPP and SAPP in dry form to the Milk Bone ® formula. In the prior examples the pyrophosphates were dissolved in water.

Test

To balance calcium and phosphorus ratio, the following formula changes were made:

Eliminated dicalcium phosphate - this decreased the calcium and phosphorus level.

Eliminated bone meal - this decreased the calcium and phosphorus.

Purpose of above changes was primarily to decrease the phosphorus content.

However, to compensate for the decreases in calcium from the above change, the following formula change was made:

Increased calcium carbonate to increase calcium level.

Dicalcium phosphate, bone meal and calcium carbonate are ingredients in regular Milk Bone ®.

Evaluate the effect of formula changes (omission of the dicalcium phosphate and bone meal and increase calcium carbonate) on mixing rotary molding.

Results: Formula #5

Nutritional Data

| Calcium | 1.807 | 1.1 to 1.0 ratio |
|---|---|---|
| Phosphorus | 1.690 | |
| Potassium | 0.799 | |
| Sodium | 1.336 | |
| Chloride | 0.495 | |

Results

The formula of Example 5 has an acceptable calcium to phosphorus ratio. (It is best not to go over 1.9 percent of calcium). The lowering of the sodium level and the raising of the chloride level, but not over the 0.8 percent level, are recommended. The above nutritional data represents only the nutrients most affected by the addition of TSPP and SAPP.

Pilot Plant Trials (Formula of Example 5)

Purpose

To evaluate the effect on dough development of adding TSPP and SAPP in dry form (blended with Milk Bone® dries). Granular TSPP and SAPP were used for the trials. To evaluate the affect of the adjustments made by the omission of dicalcium phosphate and bone meal and the increase of calcium carbonate. All of the changes influence the water absorption properties of the formula. The TSPP and SAPP may also influence the protein (gluten) development.

Results

The granular TSPP and SAPP did not dissolve and could be seen throughout the dough and finished product. The doughs were not fully developed (crumbly) and short. With the addition of extra water the doughs were becoming sticky—this would create problems with the rotary molding of biscuits.

pH of biscuits: Control 1, 6.12; Example 3 formula, 6.36.

This example disclosed: The tetrasodium pyrophosphate (TSPP) should be with tetrapotassium pyrophosphate (TKPP). This change will decrease sodium level—but increase potassium. The salt should be eliminated from the formula. This change will decrease the sodium and chloride levels. Calcium chloride should be added. This will increase the chloride to an acceptable level. However, this change will also increase the calcium. Therefore, calcium carbonate will be decreased to keep the calcium and phosphorus ratio in balance. It is best not to go over 1 percent of calcium chloride in the formula. There should be a change from granular to powdered pyrophosphates.

EXAMPLE 6

2.34% Soluble Pyrophosphate Delivery Pilot Plant Study

Purpose

To balance the sodium and chloride levels. To produce a product for palatability kennel testing.

Formula changes:

Changes in the formula were:

Eliminated salt from formula - decreases sodium and chloride.

Replaced TSPP with TKPP - decreases sodium - increases potassium.

Added calcium chloride - to increase chloride.

Decreased calcium carbonate due to addition of calcium chloride which increased calcium level.

Changed to powdered pyrophosphates instead of granular pyrophosphates.

Results

Nutritional data

| Calcium % | 1.843 | 1.16 to ratio |
|---|---|---|
| Phosphorus % | 1.585 | 1.0 |
| Potassium % | 1.252 | |
| Sodium % | 0.516 | |
| Chloride % | 0.662 | |

The formula was found to be acceptable (nutritionally balanced). This includes potassium, sodium and chloride. Tetrapotassium pyrophosphate delivers less pyrophosphate than (TSPP) tetrasodium pyrophosphate. This is the reason for the reduction of soluble pyrophosphate delivery.

Pilot Plant Trials

Purpose

To evaluate the use of powdered TKPP and SAPP. To evaluate the effect on dough and finished product due to ingredient changes in formula.

Results

The powdered TKPP and SAPP were not visible (by eye) throughout the dough and finished product. The development of the dough was approximately the same as in the formula of Example 5. It was short and on the crumbly side and approaching stickiness. It was felt that the addition of more water would increase stickiness and result in poor machining of biscuits.

pH of Biscuits; control 6.0; formula of Example 6 5.75

This example disclosed the following changes should be made: The addition of more tallow. Standard Milk Bone® formula contains 32 pounds of tallow—will increase to 37 pounds. With the addition of extra tallow, extra water will be added to the formula to help minimize dough stickiness. The extra tallow should also improve palatability.

Palatability Kennel Test Results - Formula of Example 6.

Kennel Test

Control (regular Milk Bone® formula) vs. Formula of Example 6 (standard water and standard tallow level).

Results - No significant preference was shown between the two products.

EXAMPLE 7

2.34% Soluble Pyrophosphate Delivery Pilot Plant Study

Purpose

To evaluate the mixing, machining and finished product of the Formula of Example 6 with a slight increase in tallow. With the addition of extra tallow, the water will be increased for better dough development.

Formula Chanqes

Increased tallow from 32 pounds to 37 pounds.

Results

Nutritional Data - Formula of Example 7

See below.

pH of biscuits: control, 6.1; Formula of Example 7, 5.8.

Pilot Plant Trials

Purpose

Same as above.

Three batches were made: (1) control standard Milk Bone® formula; (2) pyrophosphate biscuits (test #1) with previous water level; (3) pyrophosphate biscuits (Test #2) with increased water. Test #1 and Test #2 - have the same increased level of tallow. Sufficient quantities of the three batches were made for palatability kennel testing.

Results

Test #1 - used previous water level but increased the tallow. The dough was improved over previous doughs. However, it still was short and crumbly. The finished product had a rough surface—there was no stickiness.

Test #2 - used increased water and tallow which resulted in a smoother more developed dough. The finished product was also smoother with less surface cracks. The hardness values of the biscuits are close to control Milk Bone ® hardness.

The tallow and water adjustments were made in the pilot plant using a horizontal mixer. The above processing improvements were evaluated in actual plant trials using a continuous mixer with improved processing results.

Kennel Test Results
 Kennel Test:
 Control vs. Test #1 - a significant preference was shown for Test #1 product.
 Kennel Test:
 Control vs. Test #2 - a significant preference was shown for Test #2 product.

This Example is a preferred composition, and Test #2 is a preferred processing embodiment.

Nutritional Data - Formula of Example 7
 Calcium - 1.843%
 Phosphorus - 1.585%
 Potassium - 1.252%
 Sodium - 0.516%
 Chloride - 0.662%

EXAMPLE 8

1.6% Pyrophosphate Delivery Pilot Plant Study

Purpose

To develop a Milk Bone ® formula containing a lower level of pyrophosphate (SAPP and TKPP). The level is approximately 1.6 percent of delivered pyrophosphate. With the lower levels of SAPP and TKPP, less formula adjustments are needed to meet nutritional requirements of the National Research Council (NRC).

Formula Changes (Example 8a)

The changes in this formula are compared to the formula of Example 7:
 Calcium Carbonate - decreased from 37 to 15 lbs.
 Calcium Chloride - decreased from 13.5 to 13 lbs.
 TKPP - decreased from 18 to 12 lbs.
 SAPP - decreased from 27 to 18 lbs.
 Sodium Bicarbonate - Added as a leavening agent Results Nutritional data Calcium - 1.581%  ⎫
 Phosphorus - 1.333% ⎬ 1.2 to 1.0 ratio
 Potassium - 1.105%

Sodium - 0.488%
 Chloride - 0.651%

The Example 8A formula is the most preferred composition.

Formula - Example 8b

This formula is basically the same as the formula of 8a. The only differences are: The meat and bone meal was decreased from 100 to 90 pounds. The level of the one component of the natural flavorants (i.e., fish meal) was increased by 10 pounds.

Results - Nutritional data

Calcium - 1.551% ⎫
 Phosphorus - 1.322% ⎬ 1.2 to 1.0 ratio
 Potassium - 1.099%
 Sodium - 0.485%
 Chloride - 0.651% pH of biscuits
 Regular Milk Bone ® - 6.18
 Formula Ex. 8a - 5.88
 Formula Ex. 8b - 5.93

Additional Information Regarding the formulas of Examples 8a and 8b:
 The ratio of the blend of TKPP and SAPP is:
 60% of SAPP and 40% of TKPP
 The level of each pyrophosphate is:
 SAPP - 1.35% of formula total weight
 TKPP - 0.899% of formula total weight Test data and results are set out in the following table:

TABLE 4

Example 8a
TARTAR CONTROL BISCUITS
PYROPHOSPHATE - APPROXIMATE DELIVERY 1.6%

| INGREDIENTS | Lbs. | PERCENT | LBS | PERCENT |
|---|---|---|---|---|
| Flour | 940.000 | 70.400 | 940.000 | 70.400 |
| Soy Bean Meal | 135.000 | 10.110 | 135.000 | 10.110 |
| Meat and Bone Meal | 100.000 | 7.489 | 90.000 | 6.740 |
| Wheat Feed | 40.000 | 2.996 | 40.000 | 2.996 |
| Tallow | 37.000 | 2.771 | 37.000 | 2.771 |
| Sodium Acid Pyrophosphate Anhydrous (Pwd.) | 18.000 | 1.348 | 18.000 | 1.348 |
| Calcium Carbonate | 15.000 | 1.123 | 15.000 | 1.123 |
| Calcium Chloride (Pwd.) Anhydrous | 13.000 | 0.974 | 13.000 | 0.974 |
| Tetrapotassium Pyrophosphate Anhydrous (Pwd.) | 12.000 | 0.899 | 12.000 | 0.899 |
| Natural Flavorants | 17.00 | 1.272 | 5.000 | 0.374 |
| Sodium Bicarbonate | 5.000 | 0.374 | 27.000 | 2.021 |
| Dough Conditioners | 2.875 | 0.216 | 2.875 | 0.216 |
| Vitamin Premix | 0.375 | 0.028 | 0.375 | 0.028 |
| TOTAL | 1,335.250 | 100.000 | 1,335.250 | 100.000 |

Definitions:
 SAPP is sodium acid pryophosphate (or trisodium monoacid pyrophosphate).
 TSPP is tetrasodium pyrophosphate.
 TKPP is tetrapotassium pyrophosphate.

What is claimed is:

1. Baked nutritionally-balanced dog biscuit comprising about 0.1 to about 10 weight percent of at least one alkali metal inorganic pyrophosphate, about 0.1 to about 7 weight percent of Ca, about 0.08 to about 6 weight percent of P, about 0.05 to about 3 weight percent of K, about 0.1 to about 3 weight percent of Na and about 0.15 to about 4.5 weight percent of Cl⁻, all of said weight percents being based upon the total weight of the dog biscuit, the weight ratio of Ca to P being between about 1.0:1 and about 16:1, the baked dog biscuit having a moisture content of about 5 to about 13 weight percent, based upon the total weight of the dog biscuit, said at least one alkali metal pyrophosphate being water soluble, the dog biscuit being slightly acid to neutral, and the dog biscuit having a water activity of 0.70 or less.

2. The dog biscuit as claimed in claim 1 wherein the alkali metal inorganic pyrophosphate is tetrasodium pyrophosphate.

3. The dog biscuit as claimed in claim 1 wherein the at least one inorganic phosphate is a combination of trisodium monoacid phyrophosphate and tetrapotassium pyrophosphate.

4. The dog biscuit as claimed in claim 1 wherein the dog biscuit contains about 0.5 to about 4 weight percent of Ca, about 0.4 to about 3 weight percent of P, about 0.15 to about 3 weight percent of K, about 0.2 to about 2 weight percent of Na, about 0.3 to about 3 weight percent of $Cl^-$, and about 0.5 to about 5 weight percent of said at least one alkali metal inorganic pyrophosphate compound, all of said weight percents being based upon the total weight of the dog biscuit, the weight ratio of Ca to P being between about 1.1:1 and about 1.4:1.

5. The dog biscuit as claimed in claim 1 wherein the dog biscuit is bone shaped.

* * * * *

Disclaimer 5,000,973—*Felice Scaglione*, Hasbrouck Heights; *Lorna C. Staples*, Teaneck, both of N. J. NUTRITIONALLY-BALANCED CANINE BISCUITS CONTAINING AN INORGANIC PYROPHOSPHATE. Patent dated Mar. 19, 1991. Disclaimer filed Nov. 8, 1990, by the assignee, Nabisco Brands, Inc.

The term of this patent subsequent to May 14, 2008, has been disclaimed.

[ *Official Gazette September 3, 1991* ]